US009958266B2

(12) United States Patent
Patzwald et al.

(10) Patent No.: US 9,958,266 B2
(45) Date of Patent: May 1, 2018

(54) CHROMATIC RANGE SENSOR INCLUDING DYNAMIC INTENSITY COMPENSATION FUNCTION

(71) Applicant: Mitutoyo Corporation, Kanagawa-ken (JP)

(72) Inventors: Andrew Michael Patzwald, Kirkland, WA (US); David William Sesko, Woodinville, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 502 days.

(21) Appl. No.: 14/795,721

(22) Filed: Jul. 9, 2015

(65) Prior Publication Data

US 2017/0010452 A1    Jan. 12, 2017

(51) Int. Cl.
*G01C 3/08*    (2006.01)
*G01B 11/02*    (2006.01)
*G02B 21/00*    (2006.01)

(52) U.S. Cl.
CPC .............. *G01C 3/08* (2013.01); *G01B 11/026* (2013.01); *G01B 2210/50* (2013.01); *G02B 21/0032* (2013.01); *G02B 21/0064* (2013.01)

(58) Field of Classification Search
CPC ........................ G02B 21/0064; G02B 21/0032; G02B 21/06; G02B 2210/50
USPC ........................................................ 356/4.01
See application file for complete search history.

(56) References Cited

U.S. PATENT DOCUMENTS

| 7,454,053 | B2 | 11/2008 | Bryll et al. |
| 7,876,456 | B2 | 1/2011 | Sesko |
| 7,990,522 | B2 * | 8/2011 | Sesko ................ G01B 11/0608 356/3.01 |
| 8,085,295 | B2 | 12/2011 | Tobiason et al. |
| 8,587,772 | B2 | 11/2013 | Sesko et al. |
| 8,587,789 | B2 | 11/2013 | Sesko |
| 8,773,757 | B2 | 7/2014 | Chen et al. |
| 9,829,312 | B2 * | 11/2017 | Xie ........................ G01C 3/08 |
| 2010/0283989 | A1 * | 11/2010 | Sesko ................ G01B 11/0608 356/4.04 |
| 2013/0222815 | A1 * | 8/2013 | Patzwald ............. G01B 11/026 356/612 |

* cited by examiner

*Primary Examiner* — Mark Hellner
(74) *Attorney, Agent, or Firm* — Seed IP Law Group LLP

(57) ABSTRACT

A chromatic point sensor (CPS) system is provided, which compensates for potential errors due to input spectral profile intensity inconsistencies that arise when driving a CPS illumination source using different power levels. The CPS system includes an optical pen comprising a confocal optical path including a chromatically dispersive element and configured to focus different wavelengths at different distances proximate to a workpiece surface to be measured, an illumination source, and CPS electronics. The CPS electronics include: an illumination source control portion configured to drive the illumination source using different power levels; a CPS wavelength detector comprising a plurality of pixels distributed along a measurement axis of the CPS wavelength detector to provide output spectral profile data; and a power level spectral compensation portion configured to compensate the output spectral profile data to remove or reduce potential errors due to input spectral profile intensity inconsistencies that arise when driving the CPS illumination source using the different power levels.

20 Claims, 8 Drawing Sheets

CHROMATIC RANGE SENSOR INCLUDING DYNAMIC INTENSITY COMPENSATION FUNCTION

BACKGROUND

Technical Field

The invention relates to precision measurement instruments, and particularly to chromatic range sensors and similar optical distance determining devices, and their use.

Description of the Related Art

It is known to use chromatic confocal techniques in optical height, distance and range sensors. As described in U.S. Pat. No. 7,876,456 (the '456 patent), which is hereby incorporated herein by reference in its entirety, an optical element having axial chromatic aberration, also referred to as axial or longitudinal chromatic dispersion, may be used to focus a broadband light source such that the axial distance to the focus varies with the wavelength. Thus, only one wavelength will be precisely focused on a surface, and the surface height or distance relative to the focusing element determines which wavelength is best focused. Upon reflection from the surface, the light is refocused onto a small detector aperture, such as a pinhole or the end of an optical fiber. Upon reflection from the surface and passing back through the optical system to the in/out fiber, only the wavelength that is well-focused on the surface is well-focused on the aperture. All of the other wavelengths are poorly focused on the aperture, and so will not couple much power into the fiber. Therefore, for the light returned through the fiber, the signal level will be greatest for the wavelength corresponding to the surface height or distance to the surface. A spectrometer-type detector measures the signal level for each wavelength, in order to determine the surface height.

Certain manufacturers refer to practical and compact chromatic range sensing (CRS) systems that operate as described above, and that are suitable for use in an industrial setting, as chromatic point sensors (CPS) or chromatic line sensors, or the like. A compact chromatically-dispersive optical assembly used with such systems is referred to as an "optical pen," or a "pen." The optical pen is connected through an optical fiber to an electronic portion of the chromatic point sensor. The electronic portion includes a light source that transmits light through the fiber to be output from the optical pen, and also provides a spectrometer that detects and analyzes the returned light. The returned light forms a wavelength-dispersed intensity profile received by the spectrometer's detector array. Pixel data corresponding to the wavelength-dispersed intensity profile is analyzed to determine the "dominant wavelength peak pixel coordinate" as indicated by a peak or centroid of the intensity profile, and the dominant wavelength peak pixel coordinate is used with a lookup table to determine the distance to the surface. The dominant wavelength peak pixel coordinate may be determined with sub-pixel resolution, and may be referred to as the "distance-indicating pixel coordinate."

Also known in the art is a "line sensor" CRS, which uses a slit aperture and focuses light along a line rather than a point, providing the capability to measure a distance to a surface at a number of points along that line, as disclosed in U.S. Pat. No. 8,773,757, which is hereby incorporated herein by reference in its entirety.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Prior art CRS and CPS systems have exhibited certain measurement errors or instabilities arising from undetermined subtle effects associated with the illumination power level. As disclosed herein, it is observed that spectral characteristics of a light source used in a CPS may vary depending on whether the light source is operated at a higher power level (e.g., at a higher duty cycle) or whether the same light source is operated at a lower power level (e.g., at a lower duty cycle). Presumably, the higher the power level, the higher the light source temperature, which may explain the effects described herein. When a spectral profile of the light source operated at a higher power level is compared with that of the light source operated at a lower power level, it is observed that the spectral profile is different. FIG. 7 illustrates eleven (11) spectral profiles of a light source (e.g., LED) operated at eleven different duty cycles, respectively, at 80 (4%), 79 (10%), 78 (20%), 77 (30%), 76 (40%), 75 (50%), 74 (60%), 73 (70%), 72 (80%), 71 (90%) and 70 (100%), comprising intensity as a function of wavelength, as measured by a CPS wavelength detector having a horizontal axis (or pixel position) calibrated to convert wavelength to CPS measurement distance. Eleven peaks associated with a "blue" wavelength intensity peak are contained in a range 10, which spans from a position 10A of an intensity profile peak obtained when the light source is operated at a duty cycle of 4%, to a position 10B of an intensity profile peak obtained when the light source is operated at a duty cycle of 100%. As shown, depending on the duty cycle of the light source, the blue wavelength intensity peak is shifted along the measurement axis of the CPS's wavelength detector between the positions 10A and 10B. These input spectrum variations will influence CPS measurement peak locations during normal (chromatic confocal) measurement operations. Consequently, a distance to the workpiece surface to be measured by the CPS, which is derived from the peak position (the "dominant wavelength peak pixel coordinate" or the "distance-indicating coordinate") during normal operation, will vary depending on a particular power level (e.g., duty cycle) used to drive the light source, particularly for measurement peak locations corresponding to the blue wavelengths. This is undesirable because it leads to distance measurement errors that depend on a power level (e.g., duty cycle), which should be freely selected to drive the light source depending on workpiece reflectivity.

Various aspects of the present invention are directed to overcoming the technical problem described above.

According to embodiments of the present invention, a chromatic point sensor (CPS) system is provided, which is configured to compensate for potential errors, including errors due to input spectral profile intensity inconsistencies that arise when driving a CPS illumination source using different power levels. The CPS system includes an optical pen comprising a confocal optical path including a chromatically dispersive element and configured to focus different wavelengths at different distances proximate to a workpiece surface to be measured. The CPS system also includes an illumination source configured to generate multi-wavelength input light comprising an input spectral profile that is input to the optical pen. The CPS system further includes CPS electronics. The CPS electronics include: an illumination source control portion configured to drive the illumination source using different power levels for respective measurements by the CPS system; a CPS wavelength detector comprising a plurality of pixels distributed along a measurement axis of the CPS wavelength detector, the plurality of pixels receiving respective wavelengths and providing output spectral profile data; and a power level spectral compensation portion configured to compensate the output spectral profile data to remove or reduce potential errors due to input spectral profile intensity inconsistencies that arise when driving the CPS illumination source using the different power levels.

According to one aspect, when the optical pen is connected to the CPS electronics and operably positioned relative to a workpiece surface to perform measurement operations, the optical pen inputs (receives) the input spectral profile from the illumination source and outputs corresponding radiation to the workpiece surface and receives reflected radiation from the workpiece surface and outputs the reflected radiation to provide an output spectral profile to the CPS wavelength detector. The output spectral profile includes a distance-dependent profile component having a wavelength peak that indicates a measurement distance from the optical pen to the workpiece surface, and a distance-independent profile component that includes a power-level dependent component corresponding to input spectral profile effects associated with variations in the relative intensities of wavelengths in the input spectral profile due to variations in the power level used to generate the multi-wavelength input light. The power level spectral compensation portion is configured to compensate the output spectral profile data to remove or reduce variations of the power-level dependent component due to input spectral profile intensity inconsistencies that arise when driving the CPS illumination source using the different power levels.

For example, the power level spectral compensation portion includes power level compensation data that characterizes the relative intensities of wavelengths in the input spectral profile for a first particular input spectral profile that results from operating the illumination source using a first particular power level setting (e.g., 100% duty cycle). The power level spectral compensation portion may further include power level compensation data that characterizes the relative intensities of wavelengths in the input spectral profile for a second particular input spectral profile that results from operating the illumination source using a second particular power level setting (e.g., 70% duty cycle). In various applications, the power level compensation data is gathered for each specific illumination source during a CPS system calibration process performed at a factory. When a user operates the CPS system using the first (or second) particular power level setting, the power level spectral compensation portion automatically compensates the resulting output spectral profile data by normalizing the relative intensities of wavelengths based on the power level compensation data that characterizes the relative intensities of wavelengths in the first (or second) particular input spectral profile. Thus, in various exemplary embodiments, the intensity normalization process is fully transparent to the user.

The power level compensation data for the first particular input spectral profile may comprise a first set of wavelength-specific power normalization factors that compensates for the power-level dependent component associated with the first particular power level setting. For example, the first set of wavelength-specific power normalization factors may be member normalization factors that are respectively derived for and correspond to the plurality of pixels of the CPS wavelength detector. Similarly, the power level compensation data for the second particular input spectral profile may comprise a second set of wavelength-specific power normalization factors that compensates for the power-level dependent component associated with the second particular power level setting. The second set of wavelength-specific power normalization factors may be member normalization factors that are respectively derived for and correspond to the plurality of pixels of the CPS wavelength detector.

In some embodiments, the CPS system includes a user interface comprising a power level selecting element operable by a user to select one of a plurality of power level settings, and the light source is driven using a particular power level setting as selected by the user. In other embodiments, the CPS system automatically determines a power level setting to be used in order to provide an operable measurement signal level in the CPS wavelength detector, and the light source is driven using the power level setting as automatically determined by the CPS system.

In accordance with further aspects of the invention, a method is provided for operating a chromatic point sensor (CPS) system to compensate for potential errors, including errors due to input spectral profile intensity inconsistencies that arise when driving a CPS illumination source using different power levels. The method includes generally three steps: the step of providing a CPS system, as described above, the step of operating the CPS system to provide an output spectral profile to a CPS wavelength detector which then provides an output spectral profile data, and the step of operating a power level spectral compensation portion of the CPS system to compensate the output spectral profile data. Optionally, the method may also include the step of operating the CPS system to determine and store power level compensation data that characterizes the relative intensities of wavelengths in at least one input spectral profile that results from operating the illumination source using a particular power level setting. The power level compensation data is used to thereafter compensate the output spectral profile data.

BRIEF DESCRIPTION OF THE SEVERAL VIEWS OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
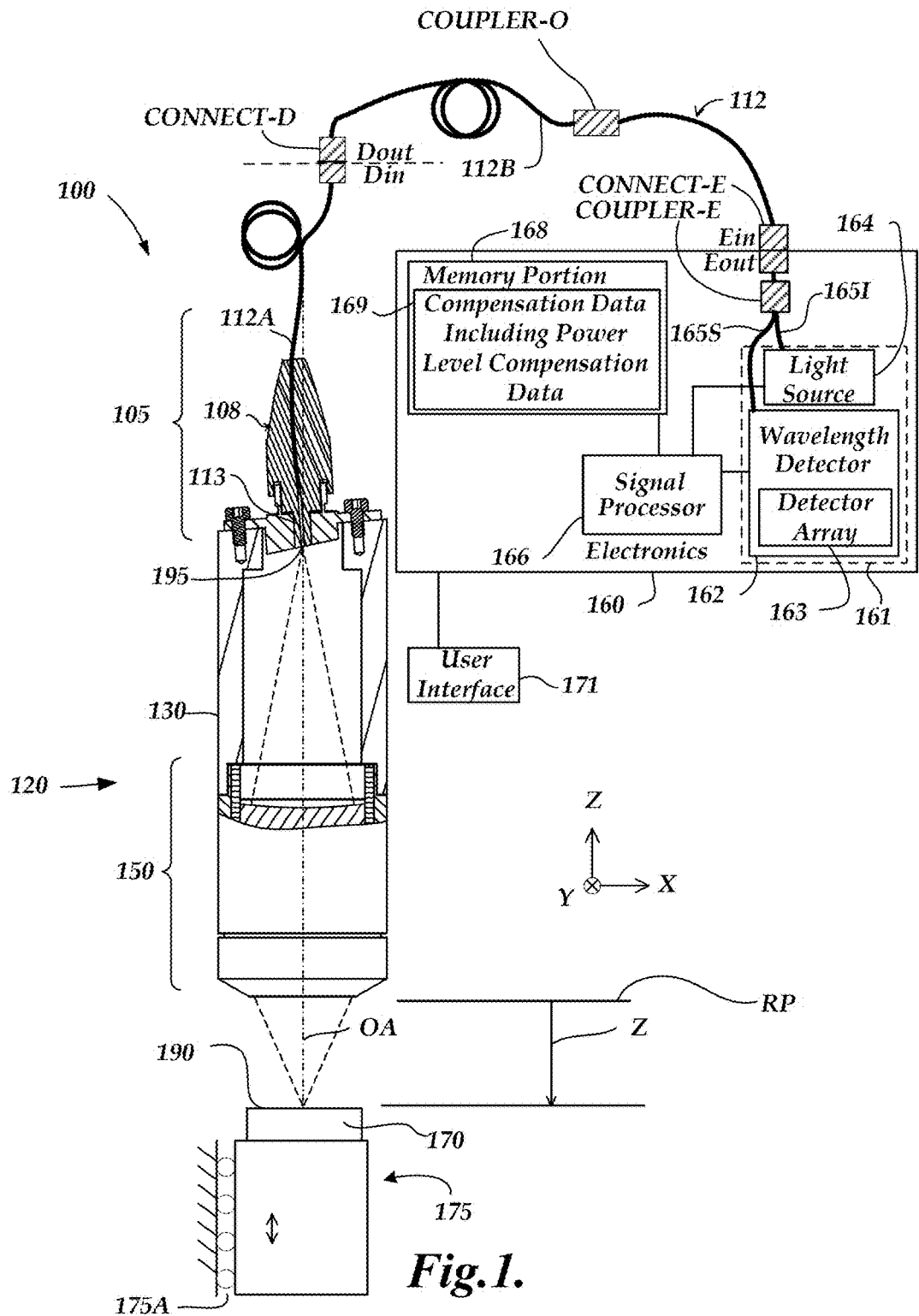
FIG. 1 is a block diagram of one embodiment of an exemplary CPS system.

FIG. 1 is a block diagram of one exemplary embodiment of a chromatic range sensor (CRS) system 100, including an optical element 120 (e.g., an optical pen), an electronics portion 160, and a user interface portion 171. The embodiment of the electronics portion 160 includes a signal processor 166, a memory portion 168 and a source and detector subsystem 161 comprising a wavelength detector 162 and a broadband light source 164. The CPS system 100 shown in FIG. 1 is a chromatic point sensor (CPS) system which measures a single measurement point at a time. In various embodiments, the wavelength detector 162 includes a detector array 163 of a spectrometer. The detector array 163 may comprise a plurality of pixels distributed along a measurement axis of the wavelength detector 162, wherein the plurality of pixels receive respective wavelengths and provide output spectral profile data. The electronics portion 160 is coupled to the optical element 120 through an optical path including a fiber optic cable 112. Optional or alternative aspects of the optical path are shown, including the fiber optic cable 112 having first and second segments 112A and 112B joined at a connector CONNECT-D in the fiber optic segment 112B, and a coupler COUPLER-O which joins the segment 112B to the electronics portion 160. The light source 164, which is controlled by the signal processor 166, is connected to input multi-wavelength light comprising an input spectral profile to the optical element 120 through a path including the illumination fiber segment 165I, the 2x1 coupler COUPLER-E, CONNECT-E, and the fiber optic cable 112. The optical element 120 includes an in/out fiber optic sub-assembly 105, a housing 130, and an optics portion 150. The in/out fiber optic sub-assembly 105 comprises an in/out optical fiber 113 carried through the fiber optic cable 112 which encases it, and a fiber optic connector 108. The in/out optical fiber 113 outputs an output beam through an aperture 195, and receives reflected measurement signal light through the aperture 195.

In operation, light emitted from the fiber end through the aperture 195 is focused by the optics portion 150, which includes a lens that provides an axial chromatic dispersion such that the focal point along the optical axis OA is at different distances depending on the wavelength of the light, as is known for CPS systems. During measurement operations, the light is focused on a surface location 190 of a workpiece 170. Light reflected from the surface location 190 is refocused by the optics portion 150 onto the aperture 195. Due to its axial chromatic dispersion, only one wavelength will have the focus distance that matches the measurement distance "Z", which is the distance from a reference position RP that is fixed relative to the optical element 120 to the surface location 190. The wavelength that is best focused at the surface location 190 is the best focused wavelength at the aperture 195. Thus, predominantly the best focused wavelength passes through the aperture 195 and into the core of the optical fiber 113 of the fiber optic cable 112. The fiber optic cable 112 routes the signal light to a wavelength detector 162 that is utilized for determining the wavelength having the dominant intensity, which corresponds to the measurement distance Z to the surface location 190.

In the illustrated embodiment, the reflected wavelength-dependent light intensity passes back to the electronics portion 160 through the fiber optic path including the coupler COUPLER-E such that approximately 50% of the light is directed through the signal fiber segment 165S to the wavelength detector 162. The wavelength detector 162 receives the wavelength-dependent light intensity as an output spectral intensity profile (also referred to simply as an output spectral profile) distributed over an array of pixels along a measurement axis of the detector array 163, and operates to provide corresponding output spectral profile data based on pixel data output from the detector array 163.

The subpixel-resolution distance-indicating coordinate (DIC) of the profile data (see FIG. 3) is calculated by the signal processor 166, and the DIC (in subpixels) determines the measurement distance Z to the surface location 190 (in microns) via a distance calibration lookup table or the like, which is stored in the memory portion 168, as described below with respect to FIGS. 4A and 4B. The DIC may be determined by various methods (e.g., by determining the centroid of intensity profile data included in a peak region). The profile data may be used to determine the DIC with subpixel resolution as described below.

The user interface portion 171 is coupled to the electronics portion 160 and is configured to receive user input used for the operation of the CPS system 100, such as a user command to select a suitable duty cycle at which to drive the illumination source 164 out of multiple duty cycles or to select other operating parameters, via any suitable means such as a keyboard, touch sensor, mouse, etc. In exemplary embodiments, the user interface portion 171 includes one or more power level selecting elements (e.g., user-selectable buttons) operable by a user to select one of a plurality of power level settings that may be used to drive the CRS light source 164. The user interface portion 171 is also configured to display information on a screen, such as a distance successfully measured by the CPS system 100.

FIG. 1 includes orthogonal XYZ coordinate axes, as a frame of reference. The Z direction is defined to be parallel to the optical axis (OA), which is the distance-measurement axis, of the optical element 120. As illustrated in FIG. 1, during operation, the workpiece 170 is placed along the optical axis OA, and may be mounted on a translation stage 175 which may be advantageously aligned such that it translates along the Z axis direction constrained by guide bearings 175A.

Figure 2:
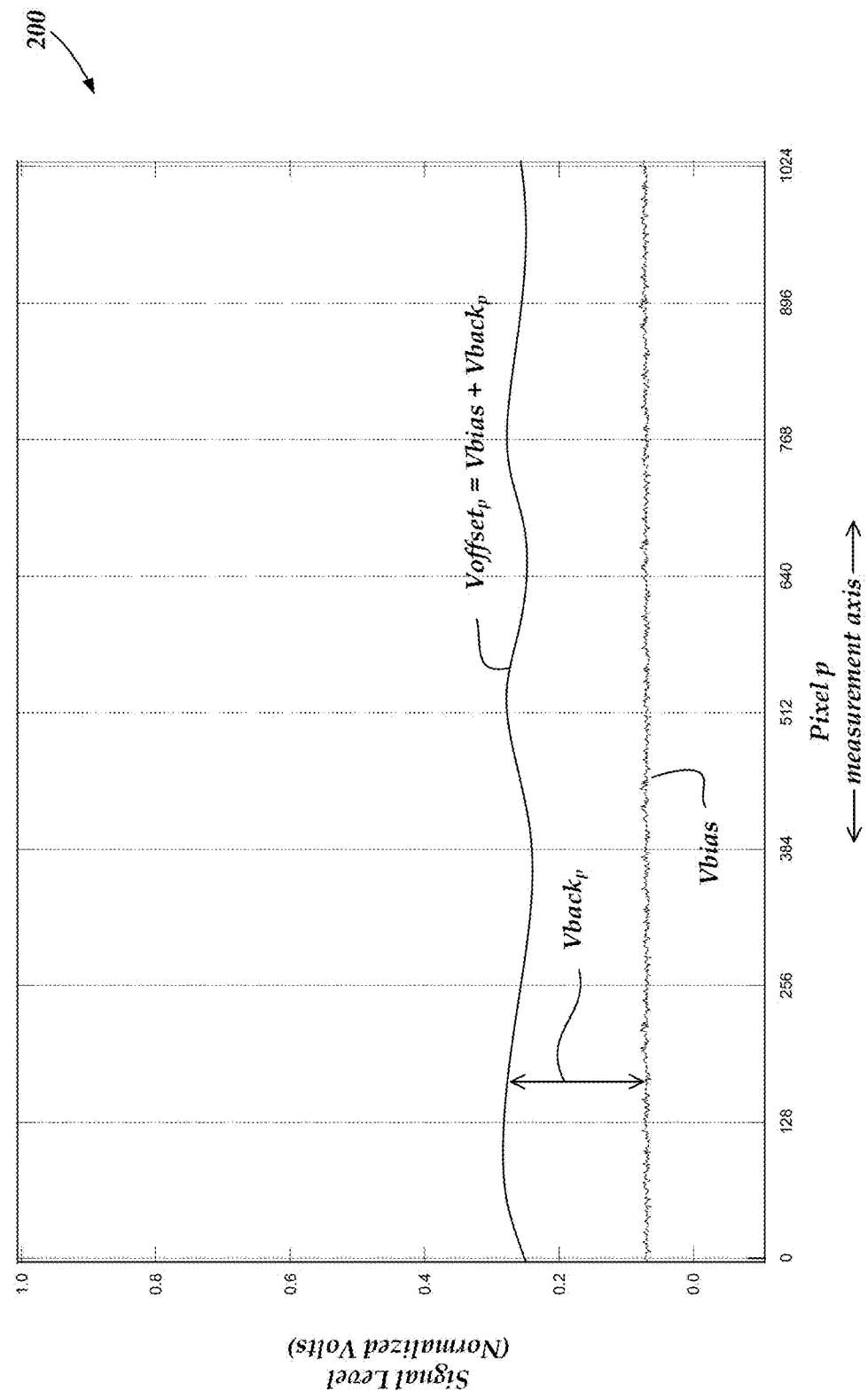
FIG. 2 is a diagram of a system noise (bias) profile from a CPS system illustrating wavelength-dependent voltage offset signal levels for the pixels in a detector array when no measurement surface is present.

The following description of FIG. 2 outlines certain known background signal processing and/or calibration operations that may be used in combination with this invention, in various embodiments. The purpose is to emphasize that the inventive methods to compensate for power-level dependent intensity variations disclosed further below are distinct from, but compatible with, these operations. FIG. 2 is a diagram 200 of a system noise (bias) profile from a CRS, illustrating voltage offset signal levels Voffset(p) for the pixels in a detector array 163 when no measurement surface is present within the nominal total measurement range of the CRS. In such a case, there is no intentionally reflected light and hence no significant or dominant wavelength peak in the resulting intensity profile. The voltage offset signal Voffset (p) is plotted in normalized volts, for each of 1,024 pixels along the "wavelength" measurement axis. "Normalized volts" assigns a value of 1.0 to the saturation voltage of the detector array 163. The voltage offset signal Voffset(p) includes a bias signal level Vbias, which is relatively consistent across the detector array, and a background signal component Vback(p), which is shown as varying across the detector array. The coordinate-independent bias signal level Vbias may change as a result of voltage drifts associated with ambient temperature changes and heat generated by the electronics portion 160 during operation. The coordinate-dependent background signal Vback(p) represents signals such as background light from wavelength-dependent spurious (internal) reflections in the CRS, as well as due to the dark current of the various pixels p. Weak but significant internal reflections may arise, for example at optical fiber coupling sections, such as fiber optic couplers and connectors, fiber optic splitters and fiber optic ends. Each CPS system also includes "distance-independent" variations including power-level dependent variations, which are not dependent on a distance to the measured surface, but instead are dependent on the power level (e.g., duty cycle) of the illumination source 164 or on a particular material of the measured surface. Thus, in various embodiments, to provide the best possible signal calibration or compensation, compensation data 169 may be stored and used to compensate for the different intensities produced by the CRS spectrometer due to some or all of these various causes for intensity variations. In particular, the compensation data 169 includes power level compensation data to compensate for power level dependent intensity variations, to thereby remove or reduce potential errors due to input spectral profile intensity inconsistencies that arise when driving the CRS illumination source 164 using different power levels. In one aspect of the invention, the compensation data 169 may also include workpiece material compensation data which is used to compensate for workpiece material dependent intensity variations.

Figure 3:
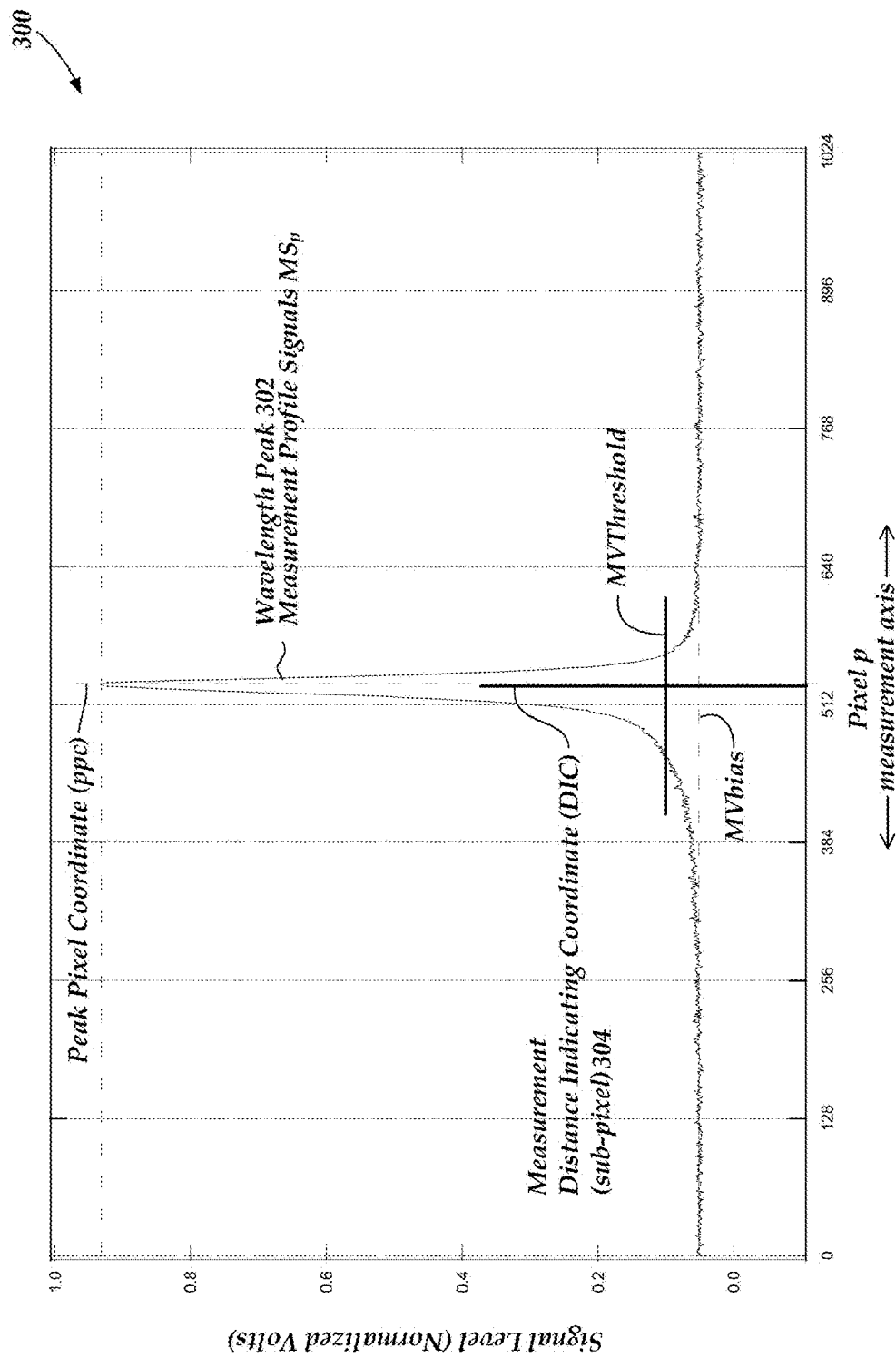
FIG. 3 is a diagram of an intensity profile from a CPS system illustrating a valid wavelength peak produced by a wavelength reflected by a measurement surface, wherein the pixel position of the peak corresponds to a measured distance to the measurement surface.
Figure 4A:
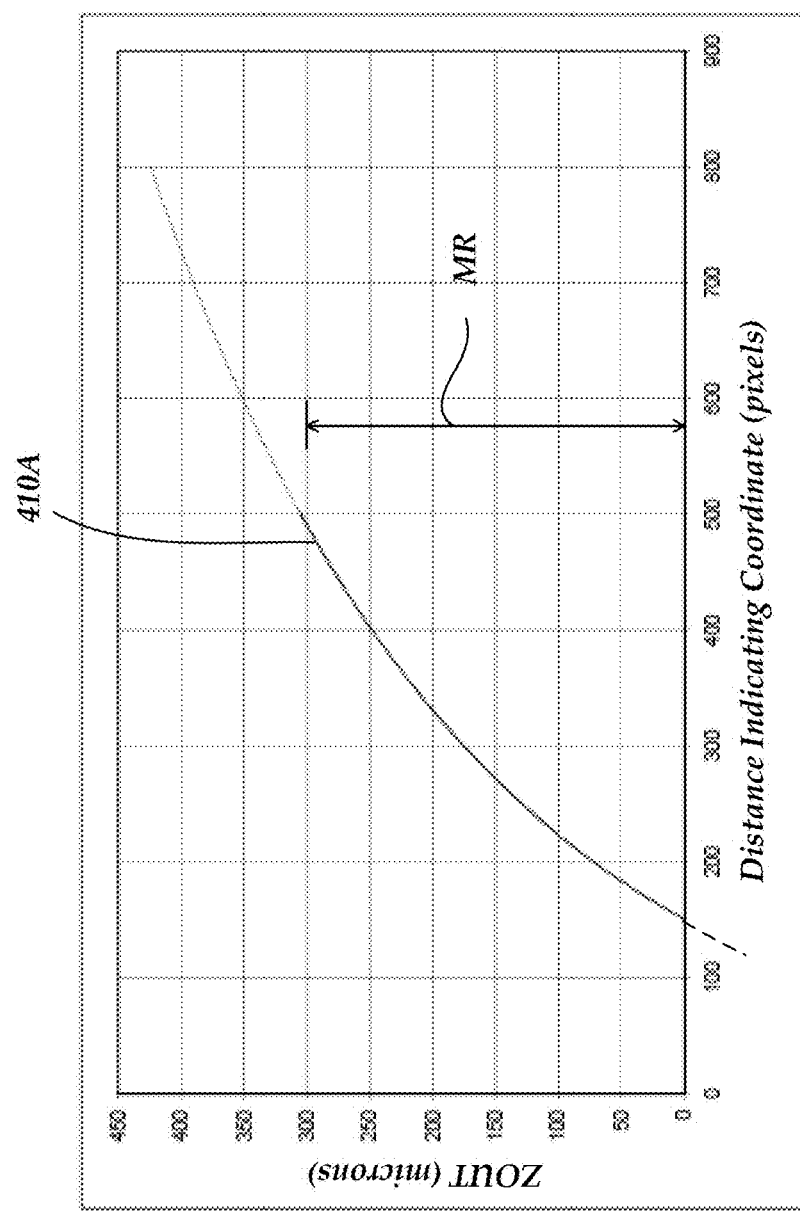
FIG. 4A is a diagram of CPS distance calibration data, which correlates distance-indicating (wavelength peak) pixel coordinates with known measurement distances to a measured workpiece surface.
Figure 4B:
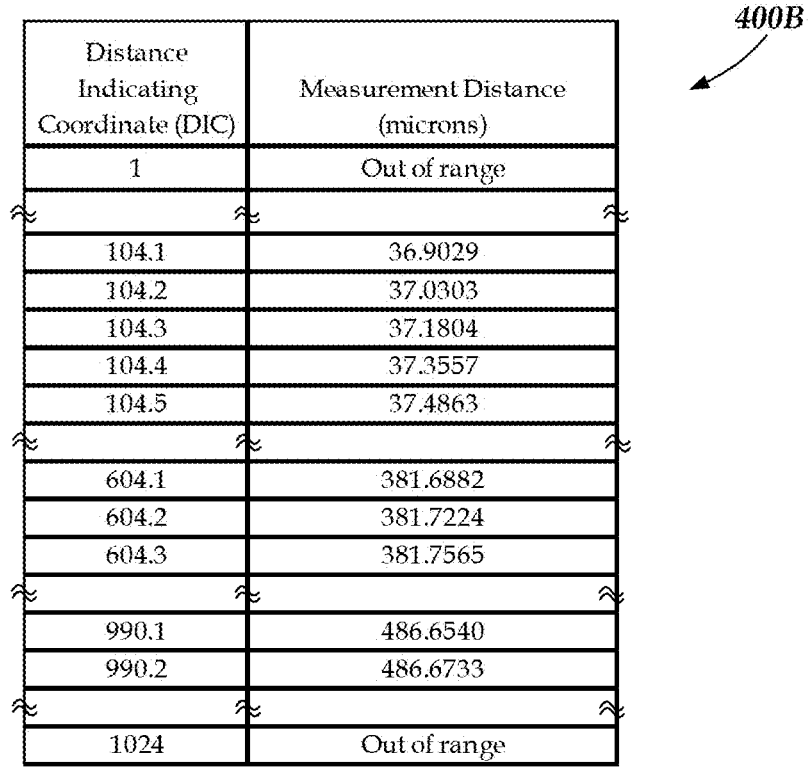
FIG. 4B is an example CPS distance calibration lookup table, which references wavelength peak pixel coordinates to corresponding measurement distances.

The following description of FIGS. 3, 4A and 4B outlines certain signal processing operations that determine distance-indicating coordinates (DIC) with subpixel resolution based on a valid wavelength peak produced in a wavelength-dispersed intensity profile from a CRS, and determine a measurement distance to a workpiece surface (e.g., in microns) based on the determined DIC. The operations outlined here are described in more detail in the '456 patent. The purpose of this description is to provide background information which is useful for an overall understanding of CRS distance measurement operations.

FIG. 3 is a diagram 300 of a wavelength-dispersed intensity profile from a CRS illustrating a valid wavelength peak 302 produced by a subset of measurement profile signals MS(p) indicative of a wavelength focused on and reflected by a measurement surface. Each of the measurement profile signals MS(p) has the signal level (shown in normalized volts) associated with each pixel p of the detector array (e.g., the detector array 163). The valid wavelength peak 302 has more than sufficient height (a good signal to noise ratio), is relatively symmetric, and allows a good estimation of the peak location or measurement distance-indicating coordinate (DIC) 304 along the measurement axis of the detector array.

FIG. 3 shows a bias signal level MVbias (in normalized volts), a peak pixel coordinate (ppc), and a data threshold MVthreshold that defines the lower limit of a distance-indicating subset of measurement profile signals MS(p) forming the wavelength peak 302. All "MV" values are in normalized volts.

Briefly, in one embodiment, measurement operations for determining a distance-indicating coordinate (DIC) (in pixels) and determining a corresponding measurement distance (in microns) based on the determined DIC may include the following:

Position the target surface along the optical axis OA, and capture the resulting wavelength-dispersed intensity profile as in the diagram 300.

Determine the peak pixel coordinate (ppc), which is the pixel that has the highest signal.

Determine the measurement bias signal level MVbias at a given sampling rate.

Determine the data threshold MVthreshold (e.g., as a percentage of the peak height).

Determine the distance-indicating coordinate (DIC) with sub-pixel resolution, based on the distance-indicating subset of measurement profile signals MS(p) forming the wavelength peak that has a value greater than MVthreshold.

Determine the measurement distance by correlating the DIC with a corresponding distance in the stored distance calibration data (e.g., a distance calibration curve as in FIG. 4A or a lookup table as in FIG. 4B).

In the foregoing operations, a DIC may be determined with sub-pixel resolution, based on the distance-indicating subset of measurement profile signals MS(p) above MVthreshold. A DIC may be determined by various methods. In one embodiment, a DIC may be determined as the subpixel-resolution coordinate of a centroid $X_C$ of the distance-indicating subset of signals MS(p). For example, for a detector with 1024 pixels, the centroid $X_C$ may be determined according to:

$$X_c = \frac{\sum_{p=1}^{1024} p(S_M(p))^n}{\sum_{p=1}^{1024} (S_M(p))^n} \quad \text{(Eq. 1)}$$

where, $$S_M(p) = \begin{cases} MS_p - MVThreshold(ppc), & \text{for } MS_p \geq MVThreshold(ppc) \\ 0, & \text{for } MS_p < MVTThreshold(ppc) \end{cases} \quad \text{(Eq. 2)}$$

In one specific example, n=2 in EQUATION 1. It will be appreciated that EQUATION 2 restricts the signals MS(p) used in the centroid calculation to a distance-indicating subset.

FIG. 4A is a diagram 400A of CRS measurement distance calibration data 410A which correlates distance-indicating coordinates (DIC) with sub-pixel resolution to known measurement distances (ZOUT) in microns along the optical axis (OA) of the CRS. The example shown in FIG. 4A is for an optical element having a nominal total measurement range MR of 300 microns, which corresponds to DICs in the range of approximately 150 pixels-490 pixels. However, the CRS may be calibrated over a larger pixel range of the detector array 163, if desired. One exemplary laboratory calibration method to determine the CRS measurement distance calibration data 410A employs a mirror (e.g., substituting for the surface at the surface location 190 of FIG. 1) moved along the optical axis OA (e.g., in approximately 0.1 or 0.2 micron steps). For each actual mirror position, the corresponding calibration DIC of the CPS system is determined based on the corresponding intensity profile data as described above. The calibration DIC and the corresponding actual position (in microns along the optical axis OA) are then recorded to provide the calibration data 410A. During a workpiece measurement operation, the measurement DIC obtained by a CPS system is referenced to the stored calibration data 410A to determine the measurement distance ZOUT corresponding to the measurement DIC.

FIG. 4B is a diagram 400B of a lookup table form of calibration data analogous to that outlined above in reference to FIG. 4A. It is intended to show one schematic representation of a lookup table format, and differences in the specific table values of FIG. 4B from those indicated in the specific calibration data 410A of FIG. 4A are not significant or relevant for this purpose. In FIG. 4B, in the left column the calibration DICs entries cover the pixel coordinates from 1 to 1,024, in increments of 0.1 pixel steps, and in the right column the corresponding measurement distances (in microns) (ZOUT) are entered. In operation, the measurement DIC calculated by the CPS system is referenced to the stored calibration lookup table in order to determine the corresponding measurement distance (in microns). If the measurement DIC falls between adjacent calibration DIC values, then the measurement distance may be determined by interpolation.

Figure 7:
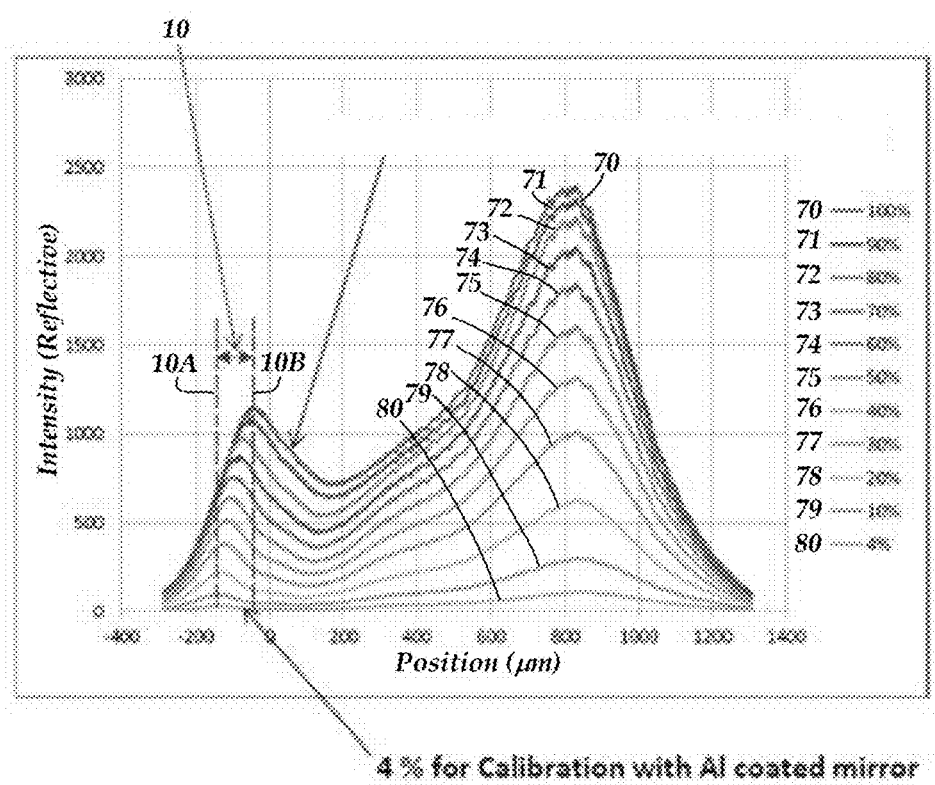
FIG. 7 is a graph illustrating the shifting of a spectral profile peak of a certain wavelength depending on the power level (e.g., duty cycle) used to drive a CPS illumination source.

As described previously in reference to FIG. 7, when a CPS system's illumination source 164 is driven using different power levels (e.g., different duty cycles), the spectral intensity profiles produced by the source vary depending on the particular power level used to drive the illumination source. According to various embodiments of the invention, a CPS system is equipped with a novel function to compensate for such spectral profile intensity inconsistencies that arise when driving the illumination source using different power levels.

Specifically, the CPS electronics portion 160 (FIG. 1) includes an illumination source control portion and a power level spectral compensation portion, both of which may be embodied and incorporated, in part or in whole, in the signal processor 166. The illumination source control portion is configured to drive the illumination source 164 using different power levels for respective measurements by the CPS system 100. The power level spectral compensation portion is configured to compensate output spectral profile data provided by the CPS wavelength detector 162, to remove or reduce potential errors due to input spectral profile intensity inconsistencies that arise when driving the CPS illumination source 164 using different power levels.

In operation, the optical pen 120 is connected to the CPS electronics portion 160 and operably positioned relative to the workpiece surface 190 to perform measurement operations. The measurement operations include the optical pen 120 inputting an input spectral profile from the illumination source 164 and outputting corresponding radiation to the workpiece surface 190 and receiving reflected radiation from the workpiece surface 190 and outputting the reflected radiation to provide an output spectral profile to the CPS wavelength detector 162, which then provides output spectral profile data. The output spectral profile includes a distance-dependent profile component and a distance-independent profile component. The distance-dependent profile component has a wavelength peak (e.g., peak 302 in FIG. 3) that indicates a measurement distance from the optical pen 120 to the workpiece surface 170. The distance-independent profile component includes a power-level dependent component corresponding to input spectral profile effects associated with variations in the relative intensities of wavelengths in the input spectral profile due to variations in the power level used to generate the multi-wavelength input light from the illumination source 164. The power level spectral compensation portion compensates the output spectral profile data to remove or reduce variations of the power-level dependent component due to input spectral profile intensity inconsistencies that arise when driving the illumination source 164 using different power levels.

The power level spectral compensation portion includes, or accesses, power level compensation data 169 in the memory portion 168. The power level compensation data characterizes the relative intensities of wavelengths in the input spectral profile for at least one particular input spectral profile that results from operating the illumination source 164 using a particular power level setting. In various exemplary embodiments, the power level compensation data is generated and stored to characterize the relative intensities of wavelengths in the input spectral profile for multiple input spectral profiles (e.g., first and second input spectral profiles) that result from operating the illumination source 164 using multiple power level settings (e.g., first and second power level settings), respectively. Then, when operating the CPS system 100 using the first power level setting, for example, the power level spectral compensation portion compensates the resulting output spectral profile data by normalizing the relative intensities of wavelengths based on the power level compensation data that characterizes the relative intensities of wavelengths in the particular input spectral profile that results from operating the illumination source at the first power level setting. Similarly, when operating the CPS system 100 using the second power level setting, the power level spectral compensation portion compensates the resulting output spectral profile data using the power level compensation data that characterizes the relative intensities of wavelengths in the particular input spectral profile that results from operating the illumination source at the second power level setting.

The power level compensation data that characterizes the relative intensities of wavelengths in the input spectral profile for the first spectral profile comprises a first set of wavelength-specific power normalization factors that compensates for the power-level dependent component associated with the first power level setting. Similarly, the power level compensation data that characterizes the relative intensities of wavelengths in the input spectral profile for the second spectral profile comprises a second set of wavelength-specific power normalization factors that compensates for the power-level dependent component associated with the second power level setting. In various embodiments, each set of wavelength-specific power normalization factors includes member normalization factors respectively corresponding to the plurality of pixels of the CPS wavelength detector 162.

The following describes a sample process that may be used to determine multiple sets of wavelength-specific power normalization factors to compensate for the power-level dependent component associated with multiple power level settings, respectively.

The CPS system 100 is re-configured to bypass the optical pen 120 to capture a set of spectrometer profiles by changing the power level setting (e.g., the duty cycle [DC]) of the illumination source 164. Some methods to bypass the optical pen 120 are described in the '456 patent incorporated hereinabove. Briefly, the methods of bypassing the optical pen 120 as taught in the '456 patent involve coupling the light source 164 to the wavelength detector 162 while replacing the CPS optical pen 120 with a reference surface (e.g., a Lambertian surface). Referring to FIG. 1, to achieve bypassing the optical pen 120, for example, the connector CONNECT-D's portion Din, the optical fiber segment 112A, and the optical pen 120 may be replaced by a Lambertian surface mounted to the connector CONNECT-D's portion Dout. As a result, light transmitted along the optical path from the light source 164 to the Lambertian surface is reflected back from the Lambertian surface into the optical path and returned to the wavelength detector 162, where it forms a spectrometer profile that plots intensity levels [I] of pixels [n] along the CPS wavelength detector 162.

By changing the duty cycle [DC] of the illumination source 164, for example at 10% increments, a set of wavelength-specific power normalization factors N, for each pixel [n] and for each duty cycle [DC], is generated as below:

$$N_{[n][DC]} = 4096/I_{[n][DC]} \quad \text{(Eq. 3)}$$

where 4096 is used in this example as a normalization target (i.e., a peak intensity), though a different value may be used as will be apparent to those skilled in the art. The power normalization factors $N_{[n][DC]}$ may be interpolated to obtain $N_{[n][DC]}$ for further (additional) duty cycles. $N_{[n][DC]}$ may be thought of as a power-level dependent transfer function of the CPS system 100 for each wavelength, which corresponds to each detector pixel. Sets of $N_{[n][DC]}$ (each set for a particular [DC] including [n] number of Ns) are uploaded to the memory portion 168 of the CPS system 100.

Next, the optical pen 120 is re-connected to the CPS electronics portion 160 and operably positioned relative to a mirror surface. Then, the CPS system 100 is operated at an arbitrary duty cycle (power level setting) to perform a standard calibration process to correlate distance-indicating coordinates (DIC) along the measurement axis of the wavelength detector 162 to known measurement distances (ZOUT) along the optical axis of the CPS system 100. At this time, optionally, a set of pen normalization factors NP, needed to achieve a peak intensity of 4096 for each pixel [n], may be generated as below:

$$NP_{[n]} = 4096/(I_{[n]} N_{[n][DC]}) \quad \text{(Eq. 4)}$$

The pen normalization factor NP is used to compensate for optical-pen dependent intensity variations for each pixel [n]. NP may be thought of as an optical-pen dependent transfer function of the CPS pen 120 for each wavelength, which corresponds to each detector pixel. A set of $NP_{[n]}$ (a set including [n] number of NPs) is uploaded to the memory portion 168 of the CPS system 100.

Further optionally, an additional scan of a measurement surface of a particular type of material (metal, wood, etc.) may be performed at an arbitrary duty cycle (power level setting), and intensities at different pixels [n] along the measurement axis of the wavelength detector 162 are measured. Then a third set of normalization factors, surface-material normalization factors NM, needed to compensate for intensity variations depending on the particular type of material of the measurement surface, may be obtained as below:

$$NM_{[n]} = 4096/(I_{[n]} N_{[n][DC]} NP_{[n]}) \quad \text{Eq. (5)}$$

The surface-material normalization factor NM is used to compensate for surface material dependent intensity variations for each pixel [n]. NM may be thought of as a surface-material dependent transfer function of the CPS system 100 for each wavelength, which corresponds to each detector pixel. A set of $NM_{[n]}$ (a set including [n] number of NMs) is uploaded to the memory portion 168 of the CPS system 100.

Finally, a set of final normalization factors NF may be obtained by combining the set of wavelength-specific power normalization factors $N_{[n][DC]}$, the set of pen normalization factors $NP_{[n]}$, and (optionally) the set of surface-material normalization factors $NM_{[n]}$, as below:

$$NF_{[n]} = N_{[n][DC]} NP_{[n]} NM_{[n]} \quad \text{Eq. (6)}$$

If the optional set of pen normalization factors $NP_{[n]}$ and the optional set of surface-material normalization factors $NM_{[n]}$ are not generated or not significant, both $NP_{[n]}$ and $NM_{[n]}$ may be set to 1 such that $NF_{[n]} = N_{[n][DC]}$.

Note that the power normalization factors $N_{[n][DC]}$ include [DC] number of sets. In one embodiment each set includes a factor for each of the n pixels of the detector for the corresponding power level. Stated another way, one set of $N_{[n][DC]}$ is a set of wavelength-specific (i.e. pixel specific) power normalization factors that compensates for the power-level dependent component associated with a particular power level setting (duty cycle).

The power normalization factors $N_{[n][DC]}$ and the final normalization factors $NF_{[n]}$ may be interpolated to obtain additional power normalization factors Ns and additional final normalization factors, respectively, for further pixel positions or sub-pixel positions along the measurement axis of the wavelength detector 162. It will be appreciated that rather than storing and using pixel-specific normalization factors, a normalization curve or function may be determined based on intensity spectrum test data obtained for some or all pixels at various power levels, and such curves or functions may be stored and used to determine power normalization factors to be used according to the principles disclosed herein.

In operation, when performing measurement operations, the power level spectral compensation portion of the CRS electronics portion 160 automatically compensates the output spectral profile data provided by the wavelength detector 162 by normalizing the relative intensities of wavelengths based on the power level compensation data (e.g., NF[n] including the power normalization factors $N_{[n][DC]}$), as below.

$$I_{[n]}' = I_{[n]} NF_{[n]} \quad \text{(Eq. 7)}$$

where $I_{[n]}'$ represents the compensated intensity level, which results from normalizing $I_{[n]}$ using the power level compensation data $NF_{[n]} (= N_{[n][DC]} NP_{[n]} NM_{[n]})$ derived for the particular power level setting being used.

As described above in reference to FIG. 1, the CPS system 100 includes the user interface portion 171 which may include a power level selecting element operable by a user to select one of a plurality of power level settings (e.g., a plurality of duty cycles). When operating the CPS system 100 using a particular power level setting as selected by the user, the CPS system 100 automatically operates the power level spectral compensation portion based on the selected particular power level setting to compensate the resulting output spectral profile data by normalizing the relative intensities of wavelengths based on the power level compensation data (e.g., $N_{[n][DC]}$) for the selected particular power level setting.

In some embodiments, the CPS system 100 is configured to automatically determine a power level setting to be used in order to provide an operable measurement signal level in the CPS wavelength detector 162. When the CPS system automatically determines that a particular power level setting is to be used to provide an operable measurement signal level in the CPS wavelength detector 162, the CPS system drives the illumination source 164 using the automatically determined power level setting and automatically operates the power level spectral compensation portion to compensate the resulting output spectral profile data by normalizing the relative intensities of wavelengths based on the power level compensation data (e.g., $N_{[n][DC]}$) for the automatically determined power level setting.

As described above, the output spectral profile provided to the wavelength detector 162 is considered to include generally two components: a distance-dependent profile component and a distance-independent profile component. The distance-dependent profile component is responsive to the measurement distance and is responsible for producing a wavelength peak that indicates a measurement distance from the optical pen 120 to the workpiece surface, as illustrated in FIG. 3 above. On the other hand, the distance-independent profile component is independent of the distance Z to a workpiece surface to be measured (for example, the input spectrum profile is not dependent on the distance to the workpiece, and it may therefore be considered to contribute to distance-independent effects that contribute to measurement errors.) The distance-independent profile component may include a power-level dependent component, which may be compensated for by a set of power normalization factors $N_{[n][DC]}$. The distance-independent profile component may also include a workpiece material component responsible for causing distance-independent, but material-dependent reflectivity (intensity) variations or inconsistencies, which may be compensated for by a set of surface-material normalization factors $NM_{[n]}$ described above. In some embodiments, these various types of compensation data (normalization factors) may be stored and/or applied separately for compensation of the various constituents of the error components in an output spectral profile that a CPS pen outputs to a CPS wavelength detector. In other embodiments, various types of compensation data may be functionally combined and stored and/or applied for compensation of all the constituents of the error components at once or sequentially.

Figure 5A:
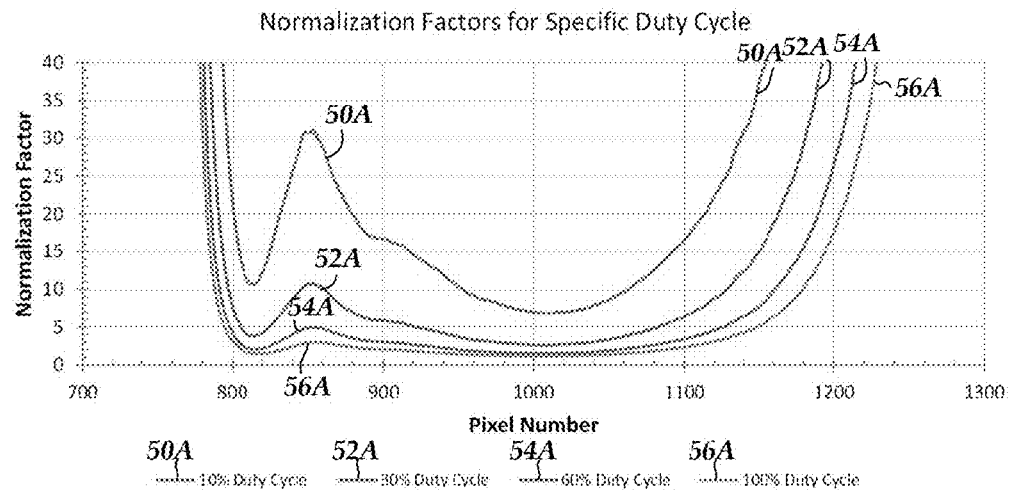
FIGS. 5A and 5B are graphs illustrating four (4) sets of wavelength-specific power normalization factors respectively obtained for four (4) different power levels (e.g., duty cycles) of the illumination source, wherein each set includes wavelength-specific power normalization factors (or member normalization factors) that are respectively derived for and correspond to the plurality of pixels of the CPS wavelength detector.
Figure 5B:
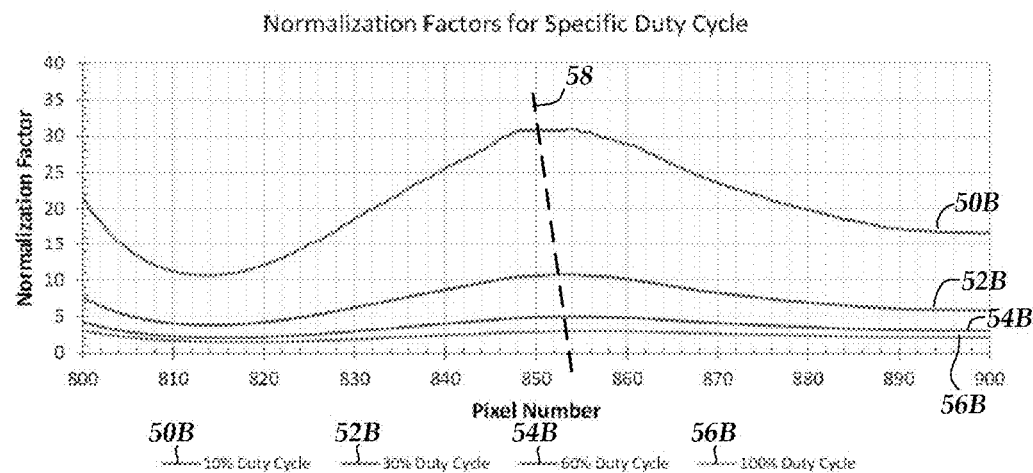

FIGS. 5A and 5B are graphs illustrating wavelength-specific power normalization factors $N_{[n][DC]}$ obtained for different power level settings (e.g., duty cycles) of the illumination source 164, for each pixel n in the wavelength detector 162 array. As shown, varying amounts of power normalization factors are defined for different power level settings (e.g., duty cycles 50A (10%), 52A (30%), 54A (60%) and 56A (100%)). FIG. 5B is an expanded-scale graph corresponding to pixel numbers 800-900 only, which is taken from the original graph of FIG. 5A corresponding to pixel numbers 700-1300. Specifically, varying amounts of power normalization factors are defined for duty cycles 50B (10%), 52B (30%), 54B (60%) and 56B (100%), in the expanded scale. In FIG. 5B, a broken line 58 indicates how the pixel location of the maximum normalization factor changes in response to power level, in order to compensate the changing wavelength peak location in the "blue" wavelengths previously outlined with reference to FIG. 7.

Figure 6:
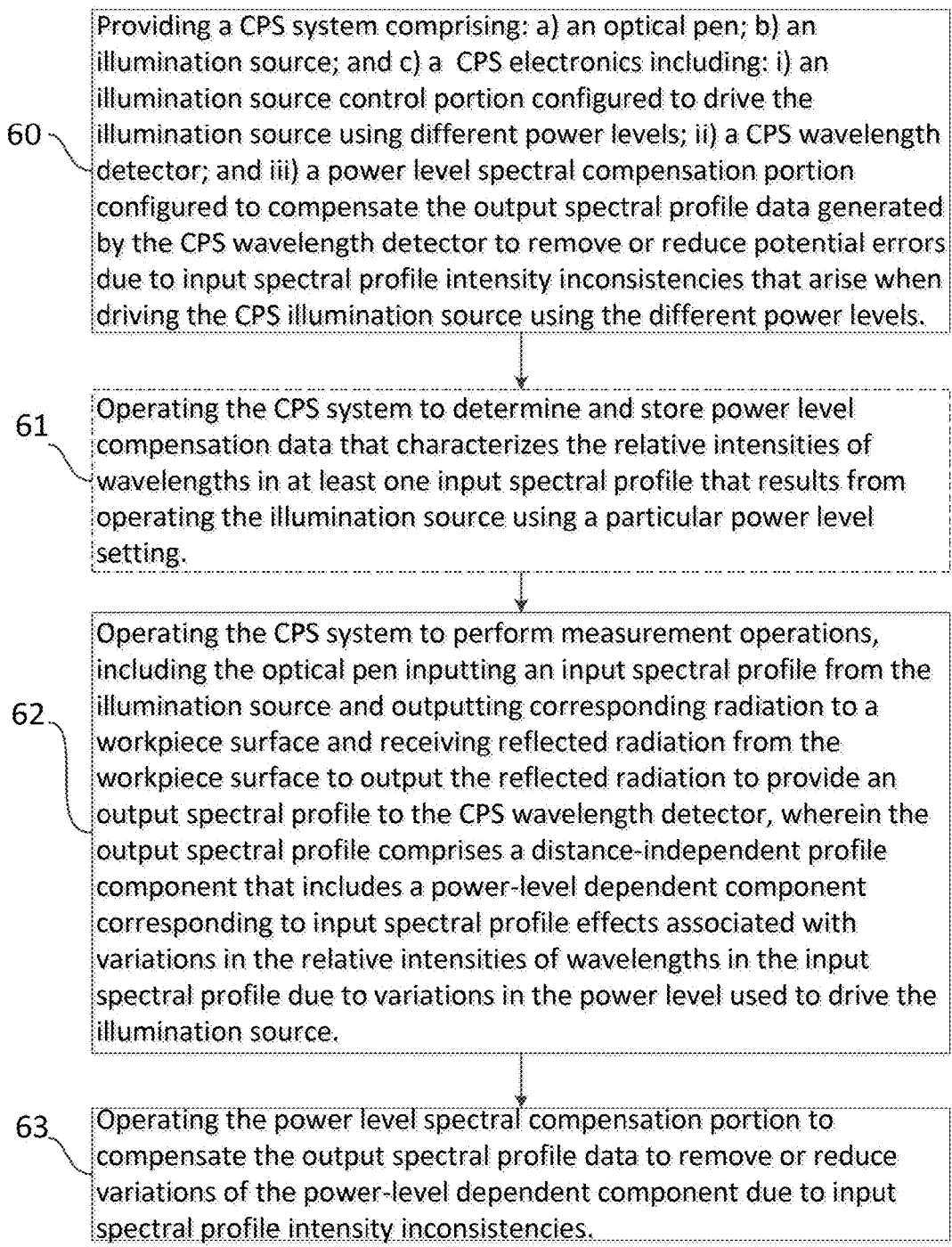
FIG. 6 is a flow diagram illustrating a method of operating a CPS system to compensate for potential errors, including errors due to input spectral profile intensity inconsistencies that arise when driving a CPS illumination source using different power levels.

FIG. 6 is a flow diagram illustrating an exemplary method of operating the CPS system 100 to compensate for potential errors, including errors due to input spectral profile intensity inconsistencies that arise when driving the CPS illumination source 164 using different power levels.

At block 60, a CPS system is provided comprising: an optical pen 120, an illumination source 164, and CPS electronics portion 160 that comprises an illumination source control portion configured to drive the illumination source using different power levels for respective measurements by the CPS system. The CPS electronics further includes a CPS wavelength detector 162 comprising a plurality of pixels distributed along a measurement axis of the CPS wavelength detector, wherein the plurality of pixels receive respective wavelengths and provide output spectral profile data. The output spectral profile data includes a wavelength peak that indicates a measurement distance from the optical pen 120 to the workpiece surface 190. The CPS electronics still further includes a power level spectral compensation portion configured to compensate the output spectral profile data to remove or reduce potential errors due to input spectral profile intensity inconsistencies that arise when driving the CPS illumination source 164 using different power levels.

At block 61, optionally, the CPS system 100 is operated to determine and store power level compensation data, such as the wavelength-specific power normalization factors $N_{[n][DC]}$ described above, that characterizes the relative intensities of wavelengths in at least one input spectral profile that results from operating the illumination source 164 using a particular power level setting. Alternatively, the CPS system 100 includes, or has access to, such power level compensation data that was previously determined.

At block 62, the CPS system 100 is operated to perform measurement operations. The measurement operations include the optical pen 120 inputting an input spectral profile from the illumination source 164 and outputting corresponding radiation to a workpiece surface 190 and receiving reflected radiation from the workpiece surface 190 to output the reflected radiation to provide an output spectral profile to the CPS wavelength detector 162. The output spectral profile comprises a distance-dependent profile component having a wavelength peak that indicates a measurement distance from the optical pen 120 to the workpiece surface 190, and a distance-independent profile component that includes a power-level dependent component corresponding to input spectral profile effects associated with variations in the relative intensities of wavelengths in the input spectral profile due to variations in the power level used to drive the illumination source 164.

At block 63, the power level spectral compensation portion is operated to compensate the output spectral profile data to remove or reduce variations of the power-level dependent component due to input spectral profile intensity inconsistencies that arise when driving the CPS illumination source 164 using different power levels.

In accordance with various embodiments, once the CPS system 100 determines and/or stores the power level compensation data 169 for each of the different power levels (e.g., different duty cycles), the power level compensation process thereafter is fully transparent to a user. For example, when a user operates the CPS system 100 to measure a distance to a workpiece surface and selects a particular power level to drive the illumination source 164, the CPS electronics portion 160 automatically retrieves and applies the power level compensation data 169 corresponding to the selected power level to remove or reduce errors due to input spectral profile intensity inconsistencies that arise when driving the illumination source 164 using the user-selected power level.

In some exemplary embodiments, measuring a distance Z to a workpiece surface along the optical axis OA of the CPS system 100 may be performed automatically in a machine vision inspection system (or a coordinate measuring machine). In such cases, the CPS system 100, including the optical pen 120 used to measure a distance Z while driving the illumination source 164 at different power levels, is included as part of a machine vision inspection system (or coordinate measuring machine). Suitable machine vision inspection systems are described in commonly assigned U.S. Pat. Nos. 8,085,295 and 7,454,053, which are hereby incorporated by reference.

While the preferred embodiments of the invention have been illustrated and described, numerous variations in the illustrated and described arrangements of features and sequences of operations will be apparent to one skilled in the art based on this disclosure. For example, a CRS including an optical pen has been shown herein. However, a CRS system such as a chromatic line sensor, may be configured to operate according to the systems and methods disclosed herein. Thus, it will be appreciated that various changes can be made to embodiments disclosed herein without departing from the spirit and scope of the invention.

The invention claimed is:

1. A chromatic point sensor (CPS) system configured to compensate for potential errors, including errors due to input spectral profile intensity inconsistencies that arise when driving a CPS illumination source using different power levels, the CPS system comprising:
   an optical pen comprising a confocal optical path including a chromatically dispersive element and configured to focus different wavelengths at different distances proximate to a workpiece surface to be measured;
   an illumination source configured to generate multi-wavelength input light comprising an input spectral profile that is input to the optical pen; and
   a CPS electronics comprising:
      an illumination source control portion configured to drive the illumination source using different power levels for respective measurements by the CPS system;
      a CPS wavelength detector comprising a plurality of pixels distributed along a measurement axis of the CPS wavelength detector, the plurality of pixels receiving respective wavelengths and providing output spectral profile data; and
      a power level spectral compensation portion configured to compensate the output spectral profile data to remove or reduce potential errors due to the input spectral profile intensity inconsistencies that arise when driving the CPS illumination source using the different power levels.

2. The CPS system of claim 1, wherein:
   the CPS system is configured such that, when the optical pen is connected to the CPS electronics and operably positioned relative to the workpiece surface to perform measurement operations, the optical pen inputs the input spectral profile and outputs corresponding radiation to the workpiece surface and receives reflected radiation from the workpiece surface and outputs the reflected radiation to provide an output spectral profile to the CPS wavelength detector;
   the output spectral profile comprises a distance-dependent profile component having a wavelength peak that indicates a measurement distance from the optical pen to the workpiece surface and a distance-independent profile component that includes a power-level dependent component corresponding to input spectral profile effects associated with variations in the relative intensities of wavelengths in the input spectral profile due to variations in the power level used to generate the multi-wavelength input light; and
   the power level spectral compensation portion is configured to compensate the output spectral profile data to remove or reduce variations of the power-level dependent component due to input spectral profile intensity inconsistencies that arise when driving the CPS illumination source using the different power levels.

3. The CPS system of claim 1, wherein:
   the power level spectral compensation portion comprises power level compensation data that characterizes the relative intensities of wavelengths in the input spectral profile for at least a first particular input spectral profile that results from operating the illumination source using a first particular power level setting; and
   when operating the CPS system using the first particular power level setting, the power level spectral compensation portion compensates the resulting output spectral profile data by normalizing the relative intensities of wavelengths based on the power level compensation data that characterizes the relative intensities of wavelengths in the first particular input spectral profile.

4. The CPS system of claim 3, wherein the power level compensation data that characterizes the relative intensities of wavelengths in the input spectral profile for at least the first particular input spectral profile comprises a first set of wavelength-specific power normalization factors that compensates for the power-level dependent component associated with the first particular power level setting.

5. The CPS system of claim 4, wherein the first set of wavelength-specific power normalization factors includes member normalization factors respectively corresponding to the plurality of pixels of the CPS wavelength detector.

6. The CPS system of claim 3, wherein:
   the power level compensation data characterizes the relative intensities of wavelengths in the input spectral profile additionally for a second particular input spectral profile that results from operating the illumination source using a second particular power level setting; and
   when operating the CPS system using the second particular power level setting, the power level spectral compensation portion compensates the resulting output spectral profile data by normalizing the relative intensities of wavelengths based on the power level compensation data that characterizes the relative intensities of wavelengths in the second particular input spectral profile.

7. The CPS system of claim 6, wherein the power level compensation data that characterizes the relative intensities of wavelengths in the second particular input spectral profile comprises a second set of wavelength-specific power normalization factors that compensates for the power-level dependent component associated with the second particular power level setting.

8. The CPS system of claim 3, wherein:
   the CPS system comprises a user interface including a power level selecting element operable by a user to select one of a plurality of power level settings including the first particular power level setting; and
   when operating the CPS system using the first particular power level setting as selected by the user, the CPS system is configured to automatically operate the power level spectral compensation portion based on the selected first particular power level setting to compensate the resulting output spectral profile data by normalizing the relative intensities of wavelengths based on the power level compensation data that characterizes the relative intensities of wavelengths in the first particular input spectral profile.

9. The CPS system of claim 3, wherein:
the CPS system is configured to automatically determine a power level setting to be used in order to provide an operable measurement signal level in the CPS wavelength detector; and
when the CPS system automatically determines that the first particular power level setting is to be used to provide an operable measurement signal level in the CPS wavelength detector, and when operating the CPS system using the first particular power level setting, the CPS system is configured to automatically operate the power level spectral compensation portion based on the determined first particular power level setting to compensate the resulting output spectral profile data by normalizing the relative intensities of wavelengths based on the power level compensation data that characterizes the relative intensities of wavelengths in the first particular input spectral profile.

10. The CPS system of claim 1, wherein:
the power level spectral compensation portion comprises power level compensation data that characterizes the relative intensities of wavelengths in each input spectral profile for a set of input spectral profiles that result from operating the illumination source using a corresponding set of discrete power level settings; and
when operating the CPS system using a first particular power level setting which falls between the discrete power level settings, the power level spectral compensation portion is configured to process the power level compensation data to determine interpolated data that characterizes the relative intensities of wavelengths in the first particular input spectral profile, and compensate the resulting output spectral profile data by normalizing the relative intensities of wavelengths based on the interpolated data.

11. The CPS system of claim 10, wherein:
the CPS system is configured to automatically determine a power level setting to be used in order to provide an operable measurement signal level in the CPS wavelength detector; and
when the CPS system automatically determines that the first particular power level setting is to be used to provide an operable measurement signal level in the CPS wavelength detector, and when operating the CPS system using the first particular power level setting, the CPS system is configured to automatically operate the power level spectral compensation portion based on the determined first particular power level setting to process the power level compensation data to determine the interpolated data that characterizes the relative intensities of wavelengths in the first particular input spectral profile, and compensate the resulting output spectral profile data by normalizing the relative intensities of wavelengths based on the interpolated data.

12. A method of operating a chromatic point sensor (CPS) system to compensate for potential errors, including errors due to input spectral profile intensity inconsistencies that arise when driving a CPS illumination source using different power levels, the method comprising:
providing a CPS system including:
a) an optical pen comprising a confocal optical path including a chromatically dispersive element and configured to focus different wavelengths at different distances proximate to a workpiece surface to be measured;

b) an illumination source configured to generate multi-wavelength input light comprising an input spectral profile that is input to the optical pen; and
c) a CPS electronics, including:
an illumination source control portion configured to drive the illumination source using different power levels for respective measurements by the CPS system;
a CPS wavelength detector comprising a plurality of pixels distributed along a measurement axis of the CPS wavelength detector, the plurality of pixels receiving respective wavelengths and providing output spectral profile data; and
a power level spectral compensation portion configured to compensate the output spectral profile data to remove or reduce potential errors due to input spectral profile intensity inconsistencies that arise when driving the CPS illumination source using the different power levels;
operating the CPS system with the optical pen connected to the CPS electronics and operably positioned relative to a workpiece surface to perform measurement operations, the measurement operations including the optical pen inputting the input spectral profile and outputting corresponding radiation to the workpiece surface and receiving reflected radiation from the workpiece surface and outputting the reflected radiation to provide an output spectral profile to the CPS wavelength detector, wherein the output spectral profile comprises a distance-dependent profile component having a wavelength peak that indicates a measurement distance from the optical pen to the workpiece surface and a distance-independent profile component that includes a power-level dependent component corresponding to input spectral profile effects associated with variations in the relative intensities of wavelengths in the input spectral profile due to variations in the power level used to generate the multi-wavelength input light; and
operating the power level spectral compensation portion to compensate the output spectral profile data to remove or reduce variations of the power-level dependent component due to input spectral profile intensity inconsistencies that arise when driving the CPS illumination source using the different power levels.

13. The method of claim 12, wherein:
the power level spectral compensation portion comprises power level compensation data that characterizes the relative intensities of wavelengths in the input spectral profile for at least a first particular input spectral profile that results from operating the illumination source using a first particular power level setting;
the step of operating the CPS system with the optical pen connected to the CPS electronics comprises operating the CPS system using the first particular power level setting; and
the step of operating the power level spectral compensation portion to compensate the output spectral profile data comprises operating the power level spectral compensation portion to compensate the resulting output spectral profile data by normalizing the relative intensities of wavelengths based on the power level compensation data that characterizes the relative intensities of wavelengths in the first particular input spectral profile.

14. The method of claim 13, wherein:
the power level spectral compensation portion comprises power level compensation data that characterizes the relative intensities of wavelengths in the input spectral profile for at least a second particular input spectral profile that results from operating the illumination source using a second particular power level setting;

the step of operating the CPS system with the optical pen connected to the CPS electronics comprises operating the CPS system using the second particular power level setting; and the step of operating the power level spectral compensation portion to compensate the output spectral profile data comprises operating the power level spectral compensation portion to compensate the resulting output spectral profile data by normalizing the relative intensities of wavelengths based on the power level compensation data that characterizes the relative intensities of wavelengths in the second particular input spectral profile.

15. The method of claim 13, wherein:

the CPS system comprises a user interface comprising a power level selecting element operable by a user to select one of a plurality of power level settings including the first particular power level setting;

the step of operating the CPS system with the optical pen connected to the CPS electronics comprises operating the CPS system using the first particular power level setting as selected by the user; and the step of operating the power level spectral compensation portion to compensate the output spectral profile data comprises automatically operating the power level spectral compensation portion based on the selected first particular power level setting to automatically compensate the resulting output spectral profile data by normalizing the relative intensities of wavelengths based on the power level compensation data that characterizes the relative intensities of wavelengths in the first particular input spectral profile.

16. The method of claim 13, wherein:

the CPS system is configured to automatically determine a power level setting to be used in order to provide an operable measurement signal level in the CPS wavelength detector;

the step of operating the CPS system with the optical pen connected to the CPS electronics comprises operating the CPS system using the first particular power level setting as automatically determined by the CPS system; and the step of operating the power level spectral compensation portion to compensate the output spectral profile data comprises automatically operating the power level spectral compensation portion based on the automatically determined first particular power level setting to automatically compensate the resulting output spectral profile data by normalizing the relative intensities of wavelengths based on the power level compensation data that characterizes the relative intensities of wavelengths in the first particular input spectral profile.

17. The method of claim 12, wherein:

the power level spectral compensation portion comprises power level compensation data that characterizes the relative intensities of wavelengths in each input spectral profile for a set of input spectral profiles that result from operating the illumination source using a corresponding set of discrete power level settings;

the step of operating the CPS system with the optical pen connected to the CPS electronics comprises operating the CPS system using a first particular power level setting which falls between the discrete power level settings; and the step of operating the power level spectral compensation portion to compensate the output spectral profile data comprises operating the power level spectral compensation portion to process the power level compensation data to determine interpolated data that characterizes the relative intensities of wavelengths in the first particular input spectral profile, and compensate the resulting output spectral profile data by normalizing the relative intensities of wavelengths based on the interpolated data.

18. The method of claim 17, wherein:

the CPS system is configured to automatically determine a power level setting to be used in order to provide an operable measurement signal level in the CPS wavelength detector;

the step of operating the CPS system with the optical pen connected to the CPS electronics comprises operating the CPS system to automatically determine the first particular power level setting which falls between the discrete power level settings and operating the CPS system using the automatically determined first particular power level setting; and the step of operating the power level spectral compensation portion to compensate the output spectral profile data comprises automatically operating the power level spectral compensation portion based on the automatically determined first particular power level setting to process the power level compensation data to determine the interpolated data that characterizes the relative intensities of wavelengths in the first particular input spectral profile, and compensating the resulting output spectral profile data by normalizing the relative intensities of wavelengths based on the interpolated data.

19. The method of claim 12, wherein:

the power level spectral compensation portion comprises power level compensation data that characterizes the relative intensities of wavelengths in each input spectral profile for a set of input spectral profiles that result from operating the illumination source using a corresponding set of discrete power level settings; and the method further comprises operating the CPS system to determine and store power level compensation data that characterizes the relative intensities of wavelengths in at least one input spectral profile out of the set of input spectral profiles that results from operating the illumination source using at least one corresponding power level setting out of the set of discrete power level settings.

20. The method of claim 19, wherein the step of operating the CPS system to determine and store the power level compensation data that characterizes the relative intensities of wavelengths in at least one input spectral profile out of the set of input spectral profiles comprises:

providing an optical path, which comprises a portion of a normal operation optical path of the CPS system and excludes the optical pen, wherein the optical path is not configured to focus different wavelengths at different distances;

positioning a reference material to receive light from the illumination source through the optical path and reflect light from the reference material through the optical path to the CPS wavelength detector;

performing a measurement operation by driving the CPS illumination source to illuminate the reference surface using a first power level setting out of the set of discrete power level settings, receiving the resulting light reflected from the reference material through the optical path by the CPS wavelength detector, and providing output spectral profile data that results from using the first power level setting to illuminate the reference material; and determining the power level compensation data that characterizes the relative intensities of wavelengths in a first corresponding input spectral profile out of the set of input spectral profiles that results from operating the illumination source using the first power level setting, based on the output spectral profile data that results from using the first power level setting.

* * * * *